US006987992B2

(12) United States Patent
Hundal et al.

(10) Patent No.: US 6,987,992 B2
(45) Date of Patent: Jan. 17, 2006

(54) MULTIPLE WIRELESS MICROPHONE SPEAKERPHONE SYSTEM AND METHOD

(75) Inventors: Sukhdeep S. Hundal, Delta (CA); Supajet Guy Pothiboon, Richmond (CA)

(73) Assignee: VTech Telecommunications, Limited, Tai Po (HK)

( * ) Notice: Subject to any disclaimer, the term of this patent is extended or adjusted under 35 U.S.C. 154(b) by 352 days.

(21) Appl. No.: 10/337,996

(22) Filed: Jan. 8, 2003

(65) Prior Publication Data
US 2004/0131201 A1    Jul. 8, 2004

(51) Int. Cl.
*H04M 1/00*    (2006.01)

(52) U.S. Cl. .............................. 455/569.1; 455/550.1; 455/73; 455/570; 455/296; 455/501; 379/419; 379/420; 379/440; 381/77; 381/79

(58) Field of Classification Search ............. 455/569.1, 455/550.1, 73, 570, 296, 501; 379/419, 420, 379/440; 381/77, 79
See application file for complete search history.

(56) References Cited

U.S. PATENT DOCUMENTS

| | | | | |
|---|---|---|---|---|
| 5,434,912 A | * | 7/1995 | Boyer et al. ........... | 379/202.01 |
| 6,671,503 B1 | * | 12/2003 | Niwamoto ................. | 455/212 |
| 6,707,910 B1 | * | 3/2004 | Valve et al. ........... | 379/388.06 |
| 6,799,062 B1 | * | 9/2004 | Piket et al. .............. | 455/569.1 |
| 2002/0065650 A1 | * | 5/2002 | Christensson et al. ...... | 704/228 |
| 2002/0142811 A1 | * | 10/2002 | Gupta et al. ................ | 455/570 |
| 2002/0193130 A1 | * | 12/2002 | Yang et al. ................. | 455/501 |
| 2003/0035550 A1 | * | 2/2003 | Kimura ....................... | 381/66 |
| 2003/0069727 A1 | * | 4/2003 | Krasny et al. ............. | 704/228 |
| 2004/0092297 A1 | * | 5/2004 | Huang ..................... | 455/575.7 |
| 2004/0096072 A1 | * | 5/2004 | Orten ......................... | 381/113 |
| 2004/0114772 A1 | * | 6/2004 | Zlotnick ..................... | 381/92 |

FOREIGN PATENT DOCUMENTS

| | | |
|---|---|---|
| EP | 1 206 161 | 5/2002 |
| GB | 2 289 593 | 11/1995 |
| WO | WO 99/33323 | 7/1999 |

OTHER PUBLICATIONS

GB Search Report dated May 12, 2004.

* cited by examiner

*Primary Examiner*—Sonny Trinh
*Assistant Examiner*—Khai Nguyen
(74) *Attorney, Agent, or Firm*—Pillsbury Winthrop Shaw Pittman LLP

(57) ABSTRACT

A multiple wireless microphone speakerphone system includes one or more wireless microphones. The wireless microphones accept speech and transmit the speech to receivers, one receiver corresponding to each wireless microphone. Audio processing and acoustic echo cancellation (AEC) are performed on the received speech signals. A signal handling unit generates an audio signal after echo cancellation. The generated audio signal is transmitted to a far end to be played through, for example, a speaker or an ear piece.

23 Claims, 4 Drawing Sheets

MULTIPLE WIRELESS MICROPHONE SPEAKERPHONE SYSTEM AND METHOD

BACKGROUND

1. Field of the Invention

Embodiments of the present invention relates generally to the field of speakerphones. More particularly, embodiments of the present invention relates to the field of wireless speakerphone implementations.

2. Background of the Invention

In a speakerphone environment it is desirable to use multiple microphones for better system performance. For reasons including convenience and mobility, it is desirable to use wireless microphones as the input to the speakerphone pod. However, using such wireless microphones presents a number of challenges.

One problem is how to provide a reference signal from the speaker to the wireless microphones to ensure proper operation of an acoustic echo canceller. Another problem is whether it is necessary to add two way air interfaces between the speaker and the microphone solely for the purpose of sending the reference signal from speaker to the microphones. Another problem is how to reduce the processor power (MIPS) requirements on the microphone part to make the architecture simple for reduced power consumption. Extending battery life and weight of a presenter's microphone are considerations as well in a wireless microphone speakerphone system.

Expanded corded microphones exist that can be used in a speakerphone environment. Use of corded microphone environments alleviates the aforementioned problems because the reference signal and signals from multiple microphones can be sent to the speakerphone pod over the wires. Moreover, the close proximity of all of the corded microphones in the system does not require that separate echo cancellers be used, as would be the case with wireless microphones that are placed, for example, at different corners of a large conference room. However, corded microphones are limited in range to the length of the cord. Cord length is limited for safety and aesthetic reasons.

BRIEF SUMMARY OF THE INVENTION

Embodiments of the present invention solves the aforementioned problems in the art by using wireless microphones to increase user mobility and convenience. Embodiments of the present invention are implemented in manner to reduce system complexity and provide better system performance. The wireless microphones of embodiments of the present invention have the advantage of being lower cost and lighter weight. Embodiments of the present invention can be employed in any speakerphone environment, including for example, in a presenter's microphone or a table top microphone.

Embodiments of the present invention can be implemented with a one-way air link from the wireless microphone to the speakerphone pod. Embodiments of the present invention employs multiple microphone signal processing based upon signal-to-noise (S/N) ratios and the ambient noise floor to improve system performance. Complexity, cost, weight and improved power consumption of the microphone are reduced by performing multiple signal processing and acoustic echo cancellors on the speakerphone pod rather than the microphone part. In addition, embodiments of the present invention employs dedicated echo cancellers for all microphone signals.

In one embodiment, the present invention is a multiple wireless microphone speakerphone system that includes a plurality of wireless microphones, each wireless microphone having an antenna for transmitting speech. The wireless microphones are in communication with a signal processing unit. The signal processing unit includes an antenna for receiving the speech transmitted by each of the plurality of wireless microphones, a plurality receivers, each receiver receiving speech transmitted by one of the plurality of wireless microphones, an audio processing unit coupled to each receiver for processing speech received by the receiver the audio processing unit is coupled to and a signal handling unit to generate an audio signal for broadcast from the speech received by one or more of the plurality of receivers. The signal processing unit can also include a plurality of echo cancellors, each echo cancellor processing one of the received wireless microphone signals to eliminate echo to a far end speaker.

In another embodiment, the present invention is a method for providing a multiple wireless speakerphone system. In the method, a signal is received from each of the plurality of wireless microphones. Echo cancellation is performed on each received signal independently. An audio signal is generated using at least one of the echo cancelled signals. The audio signal is transmitted to a far end.

In addition, in another embodiment of the method, a determination is made as to whether each received signal is a voice signal. Those signals determined not to be voice signals are muted. Echo cancellation is performed on those signals determined to be voice signals.

DETAILED DESCRIPTION OF THE INVENTION

Figure 1:
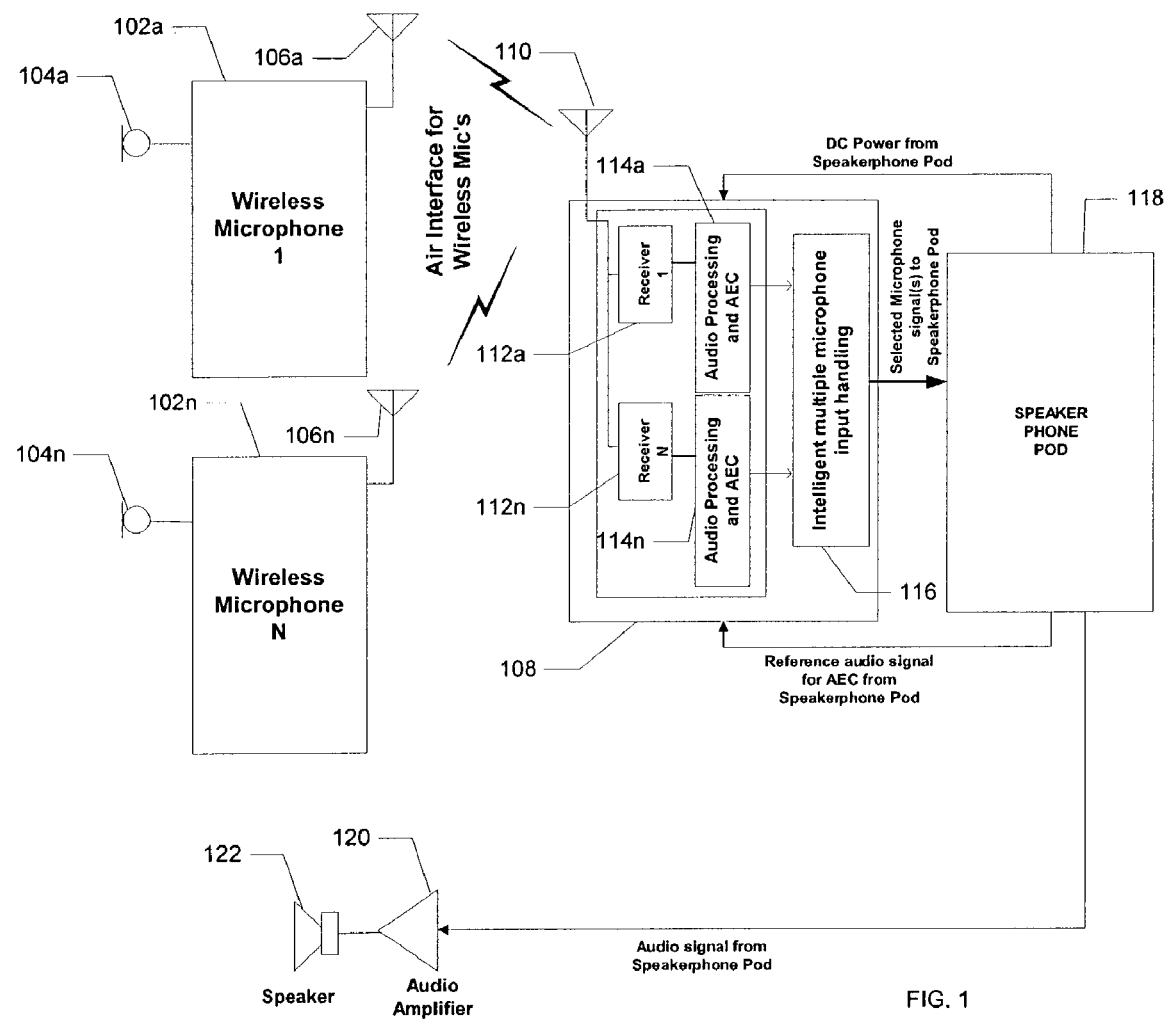
FIG. 1 is a schematic of a multiple wireless microphone speakerphone system according to an embodiment of the present invention.

FIG. 1 is a schematic diagram of a multiple wireless microphone speakerphone system according to a preferred embodiment of the present invention. System 100 includes 1 to N wireless microphones 102a to 102n, where N is any positive integer. Each wireless microphone 102a to 102n includes a microphone element 104a to 104n respectively into which a person speaks. Further each wireless microphone 102a to 102n includes an antenna 106a to 106n respectively for transmitting the input provided by the person to a signal processing unit 108 through an antenna 110.

Signal processing unit 108 comprises receivers 112a to 112n. Receivers 112a to 112n receive the signals transmitted by wireless microphones 102a to 102n respectively. In one embodiment of the present invention, each wireless microphone 102a to 102n is configured to transmit its signal on a unique frequency.

In another embodiment of the present invention, each wireless microphone 102a to 102n is configured to transmit its signal on an arbitrary frequency. Where arbitrary frequencies are used to transmit the wireless microphone signal, some mechanism, such as unique coding, must be provided to allow detection of individual wireless microphone signals that may be transmitted using the same frequency. For example, well known spread spectrum techniques can be used to transmit the wireless microphone signals in a common spectrum.

In another embodiment of the present invention, each wireless microphone 102a to 102n is allotted a time for transmitting its signal. For example, each wireless microphone 102a to 102n can be allotted a time slot in a time division multiple access (TDMA) system. Each wireless microphone 102a to 102n transmits its signal in its allotted time slot.

Using a unique frequency for each wireless microphone 102a to 102n provides the simplest and least complex solution to avoiding overlapping transmissions. As a result, while the other techniques described above can be used in embodiments of the present invention, the cost savings and simplicity associated with the unique frequency solution appear to make that solution optimal.

The signal received in each receiver 104a to 104n is output to an audio processing and acoustic echo cancellation (AEC) unit 114a to 114n respectively. The audio processing and AEC units 114a to 114n remove the acoustically coupled speaker signal from the microphone signals before any intelligent signal handling techniques is applied.

In an embodiment of the present invention, AEC units 114a to 114n remove the acoustically coupled signal from the microphone signals using well known echo cancellation techniques. For example, when a far end speaker's voice is played over a speaker 122 through an audio amplifier 120, one of the wireless microphones 102a to 102n could pick up that voice signal and transmit it back to the far end speaker. AEC units 114a to 114n remove this coupling so that the far end speaker does not hear himself or herself. An exemplary far end speaker is a speaker speaking via a telephone over the public-switched telephone network (PSTN).

The echo cancellors that are implemented in AEC units 114a to 114n do not have to be powerful echo cancellors. This is because microphones 102a to 102n are wireless microphones and as such are likely to be located far away from the speaker. Consequently, the acoustic coupling is not expected to be very strong. As a result, the echo cancellor can be a reduced version of a conventional echo cancellor. For example, the echo cancellor that is implemented in AEC units 114a to 114n can be implemented with a reduced number of filter taps compared to the number of taps used in AECs of conventional systems.

Multiple separate receivers with independent echo cancellers are employed on the speakerphone pod to remove the echo from the microphone signals. Multiple separate receivers are required because the acoustic coupling from speaker to various microphones will be different.

After the echo is removed from the microphone signals, the signals are passed to an intelligent microphone signal handling unit 116. Intelligent signal handling unit 116 determines which signal or signals are to be transmitted to a far end device. In one embodiment of the present invention, intelligent microphone signal handling unit 116 makes this determination by determining which signal has the highest S/N ratio. In one embodiment of the present invention, the signal having the highest S/N ratio is transmitted to a far end device. An exemplary far end device is a telephone over the PSTN. All other microphone signals are muted. Only one speaker is heard in this embodiment of the present invention.

In another embodiment of the present invention, intelligent signal handling unit 116 determines (in addition to the signal having the highest S/N ratio) any signals that have an S/N that exceeds a predetermined threshold. The predetermined threshold can be dynamically adjusted to better fit a particular environment in which the system is operating. The dynamic adjustment can be automatic or a user-adjustment. Those skilled in the art would recognize that thresholds based on measures other than S/N can be used. Intelligent signal handling unit 116 then sums the signal having the highest S/N with those that exceed the predetermined threshold into a composite signal. The composite processed signal is transmitted to a far end device. An exemplary far end device is a telephone over the PSTN. Microphone signals that do not exceed the predetermined threshold are muted. This embodiment of the present invention allows for multiple persons to speak at the same time.

Intelligent signal handling unit 116 also performs speech detection and automatic gain control (AGC) functions. The reason is that it is desirable to first detect that a particular signal is a speech signal prior to processing it. If the signal is a speech signal, gain is supplied by the AGC of intelligent signal handling unit 116 to facilitate processing of the speech signal. If the signal is not a speech signal, it is muted. Examples of signals that are to be muted include the hum of a fan or rustling of papers.

As can be seen from the above description, the wireless microphone used in the present invention has been simplified to be essentially a transmitter (with some pre-processing of the analog speech signal through filtering, modulation and amplification. All other signal processing functions have been moved to the signal processing unit 108. As described above, signal processing unit can be part of a speakerphone pod (as shown in FIG. 3) or a separate unit (as shown in FIG. 2).

Figure 2:
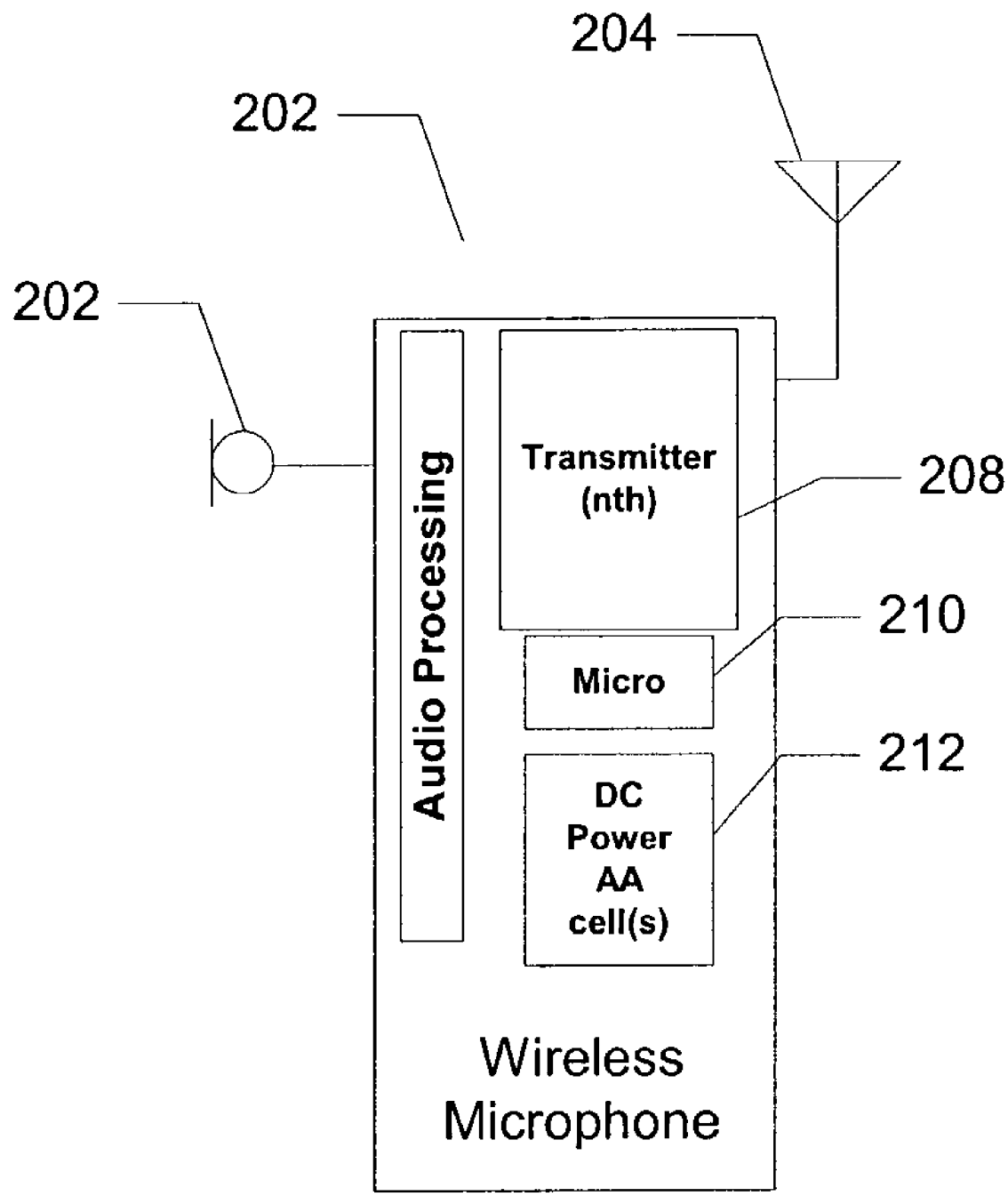
FIG. 2 is a schematic diagram illustrating a wireless microphone that can be used according to an embodiment of the present invention.

FIG. 2 is a schematic diagram of an exemplary wireless microphone 200 that can be used according to an embodiment of the present invention. Wireless microphone 200 comprises a microphone 202 that receives speech from a person. The speech is processed in audio processing unit 206. Audio speech processing unit 206 is preferably analog speech processing that amplifies and filters the speech. In addition, audio speech processing unit 206 modulates the speech to a transmission frequency for transmission by transmitter 208 through an antenna 204. A micro controller 210 controls operation of wireless microphones 200. For example, micro controller 210 controls transmission frequency as well as modulation and demodulation. Power is supplied to wireless microphone 200 by a DC power supply 212.

Figure 3:
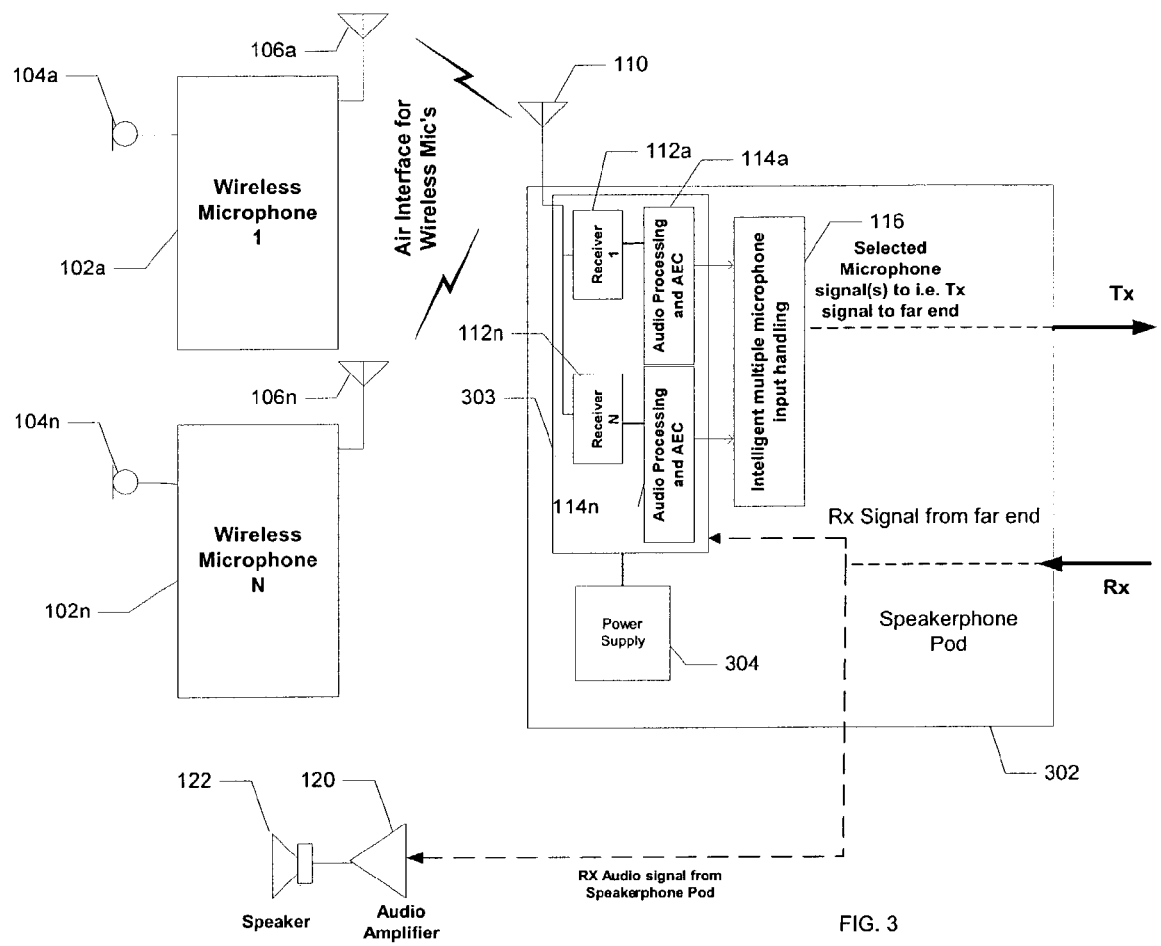
FIG. 3 is a schematic diagram illustrating a multiple wireless microphone systems according to another embodiment of the present invention

FIG. 3 is a multiple wireless microphone speakerphone system 300 according to another embodiment of the present invention. The elements of system 300 are similar to those illustrated in system 100 of FIG. 1, and like numbered elements have the same function. In system 300 however, a speakerphone pod 302 comprises the functionality of signal handling unit 108 of FIG. 1. For example, in one embodiment of the present invention, the electronics of signal handling unit 108 are implemented in speakerphone pod 302 in electronics 303. Speakerphone pod 302 includes a power supply 304 to provide power to electronics 303.

In FIG. 3, the received signal from the far end is output to speaker 122 through audio amplifier 120 to allow persons near speakerphone pod 302 to hear a far end speaker. For example, a far end speaker could be a speaker speaking over the PSTN. The received signal from the far end speaker is also input as a reference signal to AEC units 114a to 114n. This allows the AEC units to cancel out the far end speaker's voice from any signal broadcast out of speaker 122 that might be picked up by the far end speaker's wireless microphone. As described above because the far end speaker is likely to be far away, the echo cancellor does not have to be as powerful as required in conventional applications. This prevents the far end speaker from hearing himself or herself.

Figure 4:
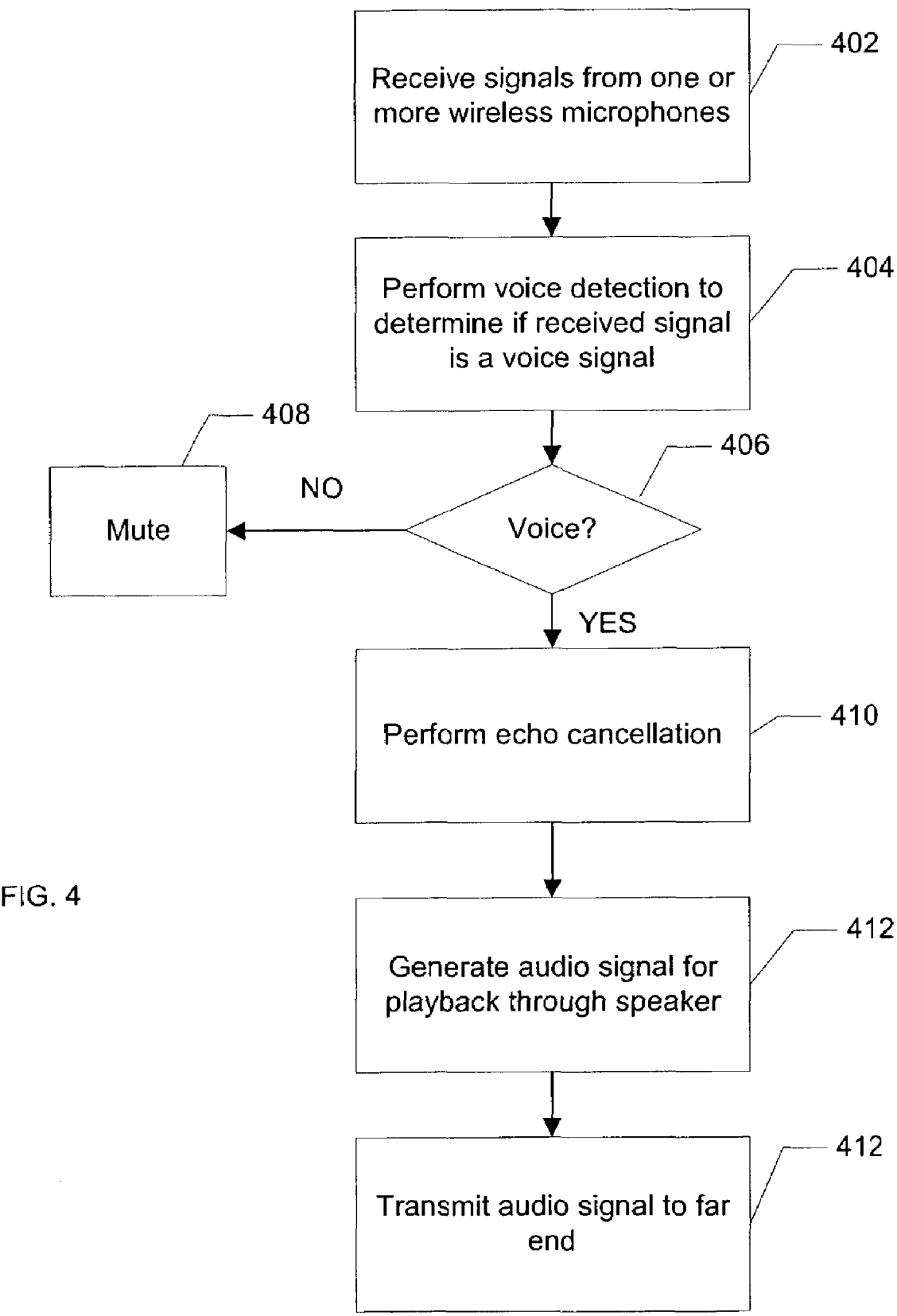
FIG. 4 is a flow chart for a method for providing a multiple wireless speakerphone system according to an embodiment of the present invention.

FIG. 4 is a flow chart for a method for providing a multiple wireless speakerphone system according to an embodiment of the present invention. In step 402, a signal is received from one or more wireless microphones. In step 404, voice detection is performed on each of the received signals to determine if the received signal is a voice signal or not. If the received signal is not a voice signal (step 406), the received signal is muted in step 408. If the received signal is a voice signal (step 406), echo cancellation is performed on the signal in step 410 to reduce or eliminate echo signals that may have been picked up by one of the wireless microphones. This reduction or elimination of echo signals helps to ensure that far end speakers do not hear themselves. In step 412, an audio signal is generated to be sent to the far end speakers. This audio signal can be generated from one or more of the signals received from the one or more wireless microphones. In step 414, the audio signal is transmitted to a far end for play through, for example, a speaker or an ear piece.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A multiple wireless microphone speakerphone system, comprising:
a plurality of wireless microphones, each wireless microphone having an antenna for transmitting speech; and
a speakerphone pod, comprising:
a signal processing unit, comprising:
an antenna for receiving the speech transmitted by each of the plurality of wireless microphones;
a plurality of receivers, each receiver receiving speech transmitted by one of the plurality of wireless microphones;
an audio processing unit coupled to each receiver for processing speech received by the receiver the audio processing unit is coupled to; and
a signal handling unit to generate an audio signal for broadcast from the speech received by one or more of the plurality of receivers.

2. The system recited in claim 1, further comprising a speaker wherein the audio processing unit includes an acoustic echo cancellor in each audio processing unit to cancel signals from a far end speaker that are played through the speaker and picked up by one or more of the plurality wireless microphones to prevent the far end speaker from hearing himself or herself.

3. The system recited in claim 2, wherein one or more of the acoustic echo cancellors is a reduced tap acoustic echo cancellor.

4. The system recited in claim 1, wherein the signal handling unit generates the audio signal using speech received by only one of the receivers.

5. The system recited in claim 1, wherein the signal handling unit generates the audio signal combining speech received by more than one of the plurality of receivers.

6. The system recited in claim 5, wherein the signal handling unit generates the audio signal by combining only received speech exceeding a predetermined threshold.

7. The system recited in claim 6, wherein the predetermined threshold is dynamically adjustable.

8. The system recited in claim 6, wherein the threshold is a signal-to-noise threshold.

9. The system recited in claim 7, wherein the threshold is a signal-to-noise threshold.

10. The system recited in claim 1, wherein each wireless microphone transmits on a unique frequency.

11. The system recited in claim 1, wherein at least two wireless microphones transmit on overlapping frequencies.

12. The system recited in claim 11, wherein the at least two wireless microphones transmit using a spread spectrum technique.

13. The system recited in claim 11, wherein the at least two wireless microphones transmit using a TDMA technique.

14. A speakerphone pod for use in a multiple wireless microphone speakerphone system having a plurality of wireless microphones, comprising:
an antenna for receiving the speech transmitted by the plurality of wireless microphones;
a plurality receivers, each receiver receiving speech transmitted by one the plurality of wireless microphones;
an audio processing unit coupled to each receiver for processing speech received by the receiver the audio processing unit is coupled to, each audio processing unit having an acoustic echo cancellor;
a signal handling unit to generate an audio signal for broadcast from the speech received by one or more of the plurality of receivers; and
a speaker to play received voice signals from at least one far end source, wherein each acoustic echo cancellor cancels a far end speaker's voice that is picked up by the wireless microphone coupled to the receiver whose received signal is processed by the audio processor containing the acoustic echo cancellor prior to generating the audio signal for broadcast.

15. The system recited in claim 14, wherein each receiver is tuned to a unique frequency to receive a signal sent by one of the wireless microphones.

16. The system recited in claim 14, wherein the signal handling unit generates an audio signal using speech received by only one of the receivers.

17. The system recited in claim 14, wherein the signal handling unit generates an audio signal combining speech received by more than one of the plurality of receivers.

18. The system recited in claim 14, wherein each receiver receives a signal sent by one of the wireless microphones using a spread spectrum technique.

19. The system recited in claim 14, wherein each receiver receives a signal sent by one of the wireless microphones using a TDMA technique.

20. The system recited in claim 14, wherein the signal handling unit generates the audio signal using only signals received by the receivers that exceed a predetermined threshold.

21. The system recited in claim 20, wherein the predetermined threshold is dynamically adjusted.

22. The system recited in claim 20, wherein the threshold is a signal-to-noise threshold.

23. The system recited in claim 21, wherein the threshold is a signal-to-noise threshold.

* * * * *